(12) United States Patent
Sasaoka et al.

(10) Patent No.: US 6,275,638 B1
(45) Date of Patent: Aug. 14, 2001

(54) DISPERSION-SHIFTED FIBER

(75) Inventors: Eisuke Sasaoka; Takatoshi Kato; Yoshio Yokoyama; Akira Urano, all of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/297,465

(22) PCT Filed: Aug. 25, 1998

(86) PCT No.: PCT/JP98/03770

§ 371 Date: Apr. 28, 1999

§ 102(e) Date: Apr. 28, 1999

(87) PCT Pub. No.: WO99/12064

PCT Pub. Date: Mar. 11, 1999

(30) Foreign Application Priority Data

Aug. 28, 1997 (JP) .................................. 9-232301

(51) Int. Cl.[7] ............................................ G02B 6/22
(52) U.S. Cl. ...................... 385/127; 385/142; 385/144
(58) Field of Search .................................. 385/123, 124, 385/126, 127, 141, 142, 144

(56) References Cited

U.S. PATENT DOCUMENTS

| | | | | |
|---|---|---|---|---|
| 4,802,733 | * | 2/1989 | Bachmann et al. | 385/123 |
| 5,013,131 | * | 5/1991 | Fotheringham | 385/124 |
| 5,675,690 | * | 10/1997 | Nouchi et al. | 385/127 |
| 5,799,123 | * | 8/1998 | Oyobe et al. | 385/124 |
| 5,802,235 | * | 9/1998 | Akasaka | 385/123 |
| 5,822,488 | * | 10/1998 | Terasawa et al. | 385/127 |
| 5,963,700 | * | 10/1999 | Kato et al. | 385/127 |

FOREIGN PATENT DOCUMENTS

| | | |
|---|---|---|
| 724 171 | 7/1996 | (EP) . |
| 62-52508 | 3/1987 | (JP) . |
| 63-43107 | 2/1988 | (JP) . |
| 1-163707 | 6/1989 | (JP) . |
| 2-141704 | 5/1990 | (JP) . |
| 3-132726 | 6/1991 | (JP) . |
| 7-168046 | 7/1995 | (JP) . |
| 8-304655 | 11/1996 | (JP) . |
| 9-33744 | 2/1997 | (JP) . |
| 10-246833 | 9/1998 | (JP) . |

OTHER PUBLICATIONS

Kato, M; Kurokawa, K. Miyajima, Y.; A new design for dispersion–shifted fiber with an effective area larger than 100/spi mu/m/sup 2/ and good bending characteristics, Optical Fiber Communication Conference, OFC '98 Technical Digest, pp. 301–302. Feb. 1998.*

Dispersion in GeO2–SiO2 glasses, J.W. Fleming Applied Optics/vol. 23,No. 24/Dec. 1984. p. 4486–4493.

Refractive index dispersion and related properties in fluorine doped silica. J.W. Fleming et al. Applied Optics/ vol. 22, No. 19/ Oct. 1, 1983.

(List continued on next page.)

*Primary Examiner*—Rodney Bovernick
*Assistant Examiner*—Sarah N Song

(57) ABSTRACT

A dispersion-shifted fiber includes structure configured to effectively reduce nonlinear optical effects and transmission loss caused by structural mismatching. A core region in the dispersion-shifted fiber includes an inner core and an outer core, which are both glass areas. The inner core is doped with a predetermined amount of fluorine, having an average relative refractive index difference $\Delta n_1$. The outer core is disposed between the inner core and the cladding region and is doped with a predetermined amount of germanium dioxide, having an average relative refractive index difference $\Delta n_2 (\Delta n_2 > \Delta n_1)$, such that the viscosity ratio between the inner core and the outer core at a drawing temperature is set within a predetermined range, thereby effectively restraining structural mismatching from occurring at the boundary between these glass regions.

4 Claims, 7 Drawing Sheets

OTHER PUBLICATIONS

Electronics Society Conference of the Electronic Information and Communication Association, 1995, K. Tsujikawa et al (with English translation attached).

Stress in optical waveguides, 2: Fibers. P.K. Bachmann et al. Applied Optics/vol. 26, No. 7, Apr. 1, 1987. p. 1175–1182.

* cited by examiner

PRIOR ART

*Fig.6*

| FIBER CHARACTERISTIC | EMBODIMENT1 | EMBODIMENT2 |
|---|---|---|
| $\Delta n_1$ | -0.40 | -0.60 |
| $\Delta n_2$ | 1.20 | 1.00 |
| $R_a(=a/b)$ | 0.65 | 0.60 |
| CORE DIAMETER b($\mu$m) | 7.5 | 7.1 |
| ZERO-DISPERSION WAVELENGTH $\lambda_0$($\mu$m) | 1.580 | 1.580 |
| DISPERSION SLOPE (ps/nm²/km) | 0.088 | 0.086 |
| EFFECTIVE CORE CROSS-SECTIONAL AREA $A_{eff}$($\mu$m²) | 86 | 83 |
| CUTOFF WAVELENGTH $\lambda_c$($\mu$m) | 1.7 | 1.6 |
| MDF($\mu$m) | 7.4 | 7.5 |
| NONLINEAR REFRACTIVE INDEX $N_2$(m²/w) | $3.7 \times 10^{-20}$ | $3.7 \times 10^{-20}$ |
| BENDING LOSS(dB/m) AT BENDING DIAMETER 20mm | 0.02 | 0.22 |

DISPERSION-SHIFTED FIBER

TECHNICAL FIELD

The present invention relates to a single-mode optical fiber used as a transmission line in optical communications, in particular, to a dispersion-shifted fiber suitable for wavelength-division multiplexing (WDM) transmission.

BACKGROUND ART

Conventionally, in optical communication systems employing a single-mode optical fiber as their transmission line, light in a 1.3-μm wavelength band or 1.55-μm wavelength band has often been utilized as signal light for communications. Recently, from the viewpoint of lowering the transmission loss in the transmission line, light in the 1.55-μm wavelength band has been increasingly used. Such a single-mode optical fiber employed in a transmission line for the light in the 1.55-μm wavelength band (hereinafter referred to as optical fiber for 1.55 μm) has been designed such that its wavelength dispersion (phenomenon in which pulse waves spread due to the fact that the propagating speed of light varies depending on wavelength) of the light in the 1.55-μm wavelength band becomes zero (yielding a dispersion-shifted fiber with a zero-dispersion wavelength of 1550 nm). As such a dispersion-shifted fiber, for example, Japanese Patent Application Laid-Open No. 62-52508 proposes a dispersion-shifted fiber having a dual shape core structure in which its core region is constituted by an inner core and an outer core having a refractive index lower than that of the inner core. Also, Japanese Patent Application Laid-Open No. 63-43107 and No. 2-141704 each propose a dispersion-shifted fiber having a depressed cladding/dual shape core structure in which its cladding region is constituted by an inner cladding and an outer cladding having a refractive index greater than that of the inner cladding. Further, Japanese Patent Application Laid-Open No. 8-304655 and No. 9-33744 each propose a dispersion-shifted fiber having a ring core structure.

On the other hand, in recent years, the advent of wavelength-division multiplexing transmission and optical amplifiers has enabled the realization of long-haul transmission. Hence, in order to avoid nonlinear optical effects, there has also been proposed a dispersion-shifted fiber employing the above-mentioned dual shape core structure, depressed cladding/dual shape core structure, or the like, with the zero-dispersion wavelength shifted to a wavelength shorter or longer than the center wavelength of the signal light (Japanese Patent Application Laid-Open No. 7-168046 and U.S. Pat. No. 5,483,612). Here, the nonlinear optical effects refer to phenomena in which, due to nonlinear phenomena such as four-wave mixing (FWM), self-phasemodulation (SPM), cross-phasemodulation (XPM), and the like, signal light pulses are deformed in proportion to the density in light intensity or the like. These effects become factors for restricting transmission speed or the repeater spacing in a relaying transmission system.

In the above-mentioned dispersion-shifted fibers proposed for wavelength-division multiplexing transmission, their zero-dispersion wavelength is set to a value different from the center wavelength of the signal light, thereby restraining the nonlinear optical effects from occurring, or their effective area $A_{eff}$ is elongated so as to reduce the density in light intensity, thereby restraining the nonlinear optical effects from occurring.

In particular, in the dispersion-shifted fiber shown in the above-mentioned Japanese Patent Application Laid-Open No. 8-304655 or No. 9-33744 employing a ring core structure, the dispersion slope is made smaller, whereas the effective area $A_{eff}$ is made greater, thus realizing a fiber characteristic suitable for wavelength-division multiplexing transmission.

Here, the effective area $A_{eff}$ is, as disclosed in Japanese Patent Application Laid-Open No. 8-248251, given by the following expression (1):

$$A_{eff}=2\pi(\int_0^\infty E^2 r dr)^2/(\int_0^\infty E^4 r dr) \tag{1}$$

wherein E is the electric field accompanying the propagated light, and r is the radial distance from a core center.

On the other hand, the dispersion slope is defined by the gradient of the graph indicating the dispersion characteristic in a predetermined wavelength band.

DISCLOSURE OF THE INVENTION

Having studied the conventional dispersion-shifted fibers, the inventors have found the following problems to overcome. Namely, in the above-mentioned dispersion-shifted fiber comprising a structure for effectively restraining the nonlinear optical effects from occurring, there is a problem that a dispersion-shifted fiber whose transmission loss is suppressed to a desired level or lower may not be obtained with a good reproducibility. That is, in the dispersion-shifted fiber of Japanese Patent Application Laid-Open No. 8-304655 or No. 9-33744 employing a ring core structure for suppressing the nonlinear optical effects, the thickness of the outer core (difference between the outer core radius and the inner core radius) is very small, i.e., about 1 to 2 μm. On the other hand, the average difference between the average relative refractive index difference of the average outer core and the average relative refractive index difference of the inner core is considerably large, i.e., about 1%. For increasing the relative refractive index difference of the outer core, the amount of $GeO_2$ added to the outer core has been increased in general. Increasing the amount of $GeO_2$ decreases, inversely, the viscosity of the outer core at a drawing temperature during the making of the optical fiber, however. When viewed along a diametrical direction of the optical fiber being manufactured, the change in viscosity abruptly occurs within the area of the outer core (having a thickness of about 1 to 2 μm). Such an abrupt change in viscosity in the diametrical direction causes, upon drawing of the optical fiber, an abrupt change in the tensile force applied thereto in the diametrical direction. The abrupt diametrical change in the drawing tension thus applied becomes a cause of structural mismatching or glass defect at the boundary between the inner and outer cores, thereby allowing the resulting optical fiber to increase transmission loss.

In order to overcome the problems such as those mentioned above, it is an object of the present invention to provide a dispersion-shifted fiber for WDM transmission suitable for a long-haul submarine cable or the like, which effectively restrains nonlinear optical effects from occurring, effectively suppresses transmission loss caused by structural mismatching, glass defect, or the average like, and has a structure excellent in reproducibility.

The dispersion-shifted fiber according to the present invention is a transmission medium (for example, silica ($SiO_2$) based single-mode (SM) optical fiber), comprising a core region extending along a predetermined axis and a cladding region disposed on an outer periphery of the core region, for propagating signal light in a 1.55-μm wavelength band (i.e., at least one signal light component having a center wavelength within the wavelength range of 1500 nm to 1600 nm). In this dispersion-shifted fiber, the core region, includes, an inner core which is a glass area, doped with a predetermined amount of fluorine (F), having a first average relative refractive index difference $\Delta n_1$ with respect to a predetermined region (reference region) of the cladding region; and an outer core which is a glass area doped with a predetermined amount of germanium oxide ($GeO_2$) and disposed between the inner core and the cladding region, having a second average relative refractive index difference $\Delta n_2$ greater than the first average relative refractive index difference $\Delta n_1$ with respect to the predetermined region of the cladding region. Here, the predetermined region is defined by a single layer in the case that the cladding region is constituted by the single layer, and is also defined by the outermost layer in the case that the cladding region is constituted by a plurality of layers.

In the dispersion-shifted fiber according to the present invention, both germanium dioxide ($GeO_2$) and fluorine (F), respectively, are added to the inner and outer cores to reduce the viscosity at a drawing temperature; The $GeO_2$ acts to increase the refractive index of the glass area doped therewith, while F acts to lower the refractive index of the glass area doped therewith. Hence, when the inner and outer cores are doped with F and $GeO_2$, respectively, while the viscosity difference between the inner and outer cores at a drawing temperature is kept smaller as compared with the case where the inner core is not doped with F, a sufficient average relative refractive index difference can be obtained between these glass areas. As a consequence, the structural mismatching or glass defect at the boundary between the inner and outer cores can be effectively restrained from occurring. Here, the drawing temperature is defined by a surface temperature of an optical fiber preform which is sufficiently heated for drawing.

In the dispersion-shifted fiber according to the present invention, a decrement $\Delta n_f$ in the first average relative refractive index difference caused by the F doping in the inner core and an increment $\Delta n_g$ in the second average relative refractive index difference caused by the $GeO_2$ doping in the outer core have the following relationship:

$$0.05 \cdot \Delta n_g \leq \Delta n_f \leq 0.07 \cdot \Delta n_g.$$

When the above-mentioned relationship is satisfied, the viscosity difference between the inner and outer cores at a drawing temperature can be controlled so as to become smaller. Also, the structural mismatching, glass defect, and the like can be further restrained from occurring at the boundary between the inner core and outer core.

In the dispersion-shifted fiber according to the present invention, it is preferred that the average relative refractive index difference in the inner core be smaller than the refractive index of the cladding region.

When the first average relative refractive index difference $\Delta n_1$ with respect to the cladding region is set to a negative value, a desired fiber characteristic can be realized without extremely increasing the second average relative refractive index difference $\Delta n_2$ ($\Delta n_2 > \Delta n_1$) with respect to the cladding region. This can reduce the amount of $GeO_2$ added to the outer core, and thus is more preferable from the viewpoint of restraining the nonlinear optical effects from occurring.

Further, a depressed cladding structure, which is constituted by an inner cladding provided around the outer periphery of the outer core and an outer cladding provided around the outer periphery of the inner cladding, can be applied to the cladding region. In this case, since the cladding region comprises a plurality of layer regions, a predetermined region for defining the average relative refractive index difference in each region is the outer cladding. In this cladding region, the inner cladding is doped with a predetermined amount of fluorine and has a third average relative refractive index difference $\Delta n_3$ with respect to the outer cladding.

Additionally, in the dispersion-shifted fiber having the depressed cladding structure, a decrement $\Delta n_{f1}$ in the first average relative refractive index difference caused by the F doping in the inner core, a decrement $\Delta n_{f2}$ in the third average relative refractive index difference caused by the F doping in the inner cladding and an increment $\Delta n_g$ in the second average relative refractive index difference caused by the $GeO_2$ doping in the outer core have the following relationships:

$$0.05 \cdot \Delta n_g \leq \Delta n_{f1} \leq 0.7 \cdot \Delta n_g$$

$$0.05 \cdot \Delta n_g \leq \Delta n_{f2} \leq 0.7 \cdot \Delta n_g.$$

BRIEF DESCRIPTION OF THE DRAWINGS

FIG. 1A is a view showing a typical cross-sectional structure of a dispersion-shifted fiber according to the present invention, whereas

FIG. 4A is a view showing a cross-sectional structure of the dispersion-shifted fiber according to Embodiment 1 of the present invention, whereas

FIG. 5A is a view showing a cross-sectional structure of the dispersion-shifted fiber according to Embodiment 2 of the present invention, whereas

FIG. 6 is a table listing various characteristics of the dispersion-shifted fibers shown in FIGS. 4A and 4B and FIGS. 5A and 5B; and FIG. 7A is a view showing a cross-sectional structure of the dispersion-shifted fiber according to Embodiment 3 of the present invention, whereas

BEST MODES FOR CARRYING OUT THE INVENTION

In the following, embodiments of the dispersion-shifted fiber according to the present invention will be explained with reference to FIGS. 1A, 1B, 2 and 3, 4A to 5B, 6, 7A and 7B. In the explanation of the drawings, constituents identical to each other will be referred to with numerals or letters identical to each other without repeating their overlapping descriptions.

Figure 1A:
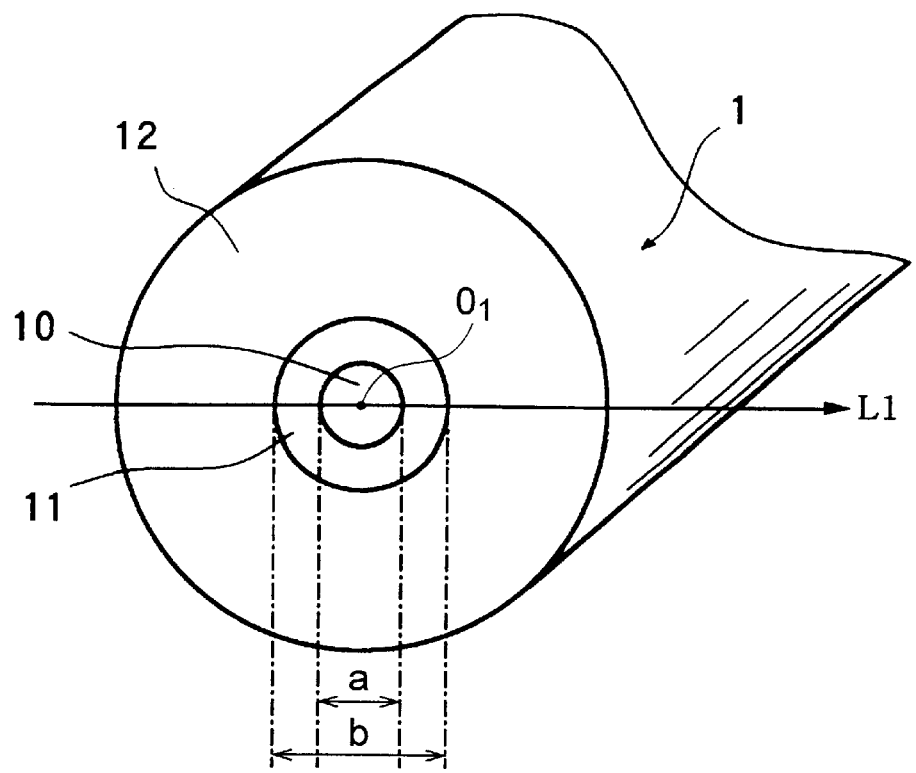
Figure 1B:
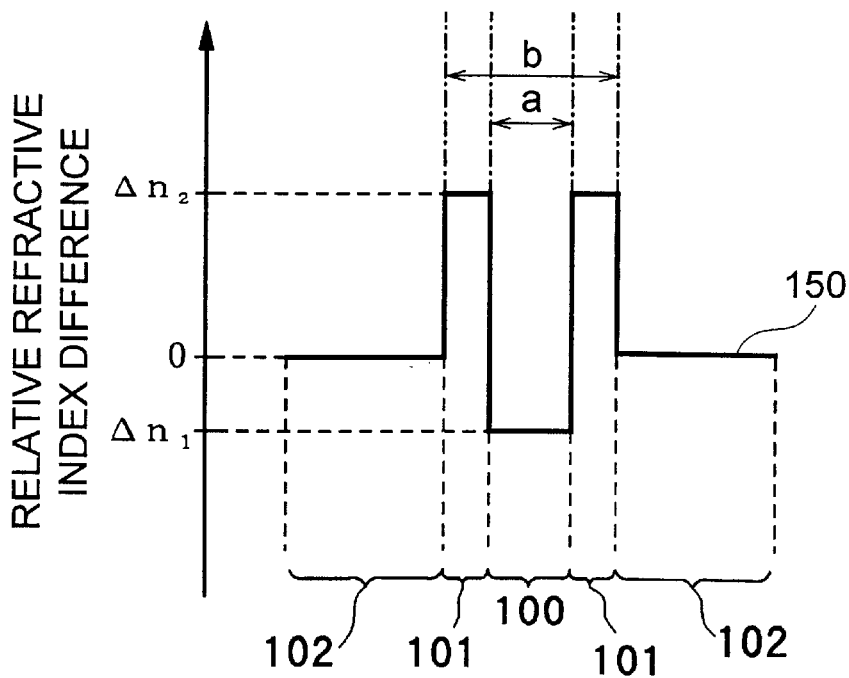
FIG. 1B is a view showing a refractive index profile of the dispersion-shifted fiber shown in FIG. 1A.

FIG. 1A is a view showing a cross-sectional structure of a dispersion-shifted fiber (silica $SiO_2$ based single-mode (SM), optical fiber) according to the present invention, whereas FIG. 1B is a view showing a refractive index profile of the dispersion-shifted fiber shown in FIG. 1A. As shown in FIG. 1A, this dispersion-shifted fiber 1 is a single-mode optical fiber mainly composed of silica glass; comprises a core region and a cladding region 12, disposed on the outer periphery of the core region, having a predetermined refractive index; and functions as a transmission medium for propagating signal light in a 1.55-$\mu$m wavelength band (at least one signal light component having a center wavelength within the wavelength range of 1500 nm to 1600 nm). In particular, employed as the structure of the core region is a ring core structure comprising, an inner core 10 (having an outer diameter a) which is a glass area, doped with a predetermined amount of fluorine (F), having an average relative refractive index difference $\Delta n_1$ with respect to the cladding region 12; and an outer core 11 (having an outer diameter b>a) which is a glass area, disposed on the outer periphery of the inner core 10 and doped with a predetermined amount of germanium oxide ($GeO_2$), having an average relative refractive index difference $\Delta n_2$ (>$\Delta n_1$) with respect to the cladding region 12. Here, the cladding region 12 may also be of a depressed cladding structure comprising at least two glass areas having refractive indexes different from each other.

The refractive index profile 150 of FIG. 1B indicates the refractive index of each location along the line L1 intersecting with a center $O_1$ in a cross section (plane orthogonal to the advancing direction of the propagating light) of the dispersion-shifted fiber 1 in conformity to FIG. 1A. In the refractive index profile 150, areas 100, 101, and 102 correspond to locations, on the line Li, of the inner core 10, outer core 11, and cladding region 12, respectively.

The above-mentioned average relative refractive index difference values $\Delta n_1$ and $\Delta n_2$ are given by:

$$\Delta n_1 = (n_1 - n_{cd})/n_{cd}$$

$$\Delta n_2 = (n_2 - n_{cd})/n_{cd}$$

wherein $n_1$ is the average refractive index of the inner core 10;

$n_2$ is the average refractive index of the outer core 11; and $n_{cd}$ is the average refractive index of the cladding region 12 as a predetermined region (refractive index of the outermost cladding in the case of a depressed cladding structure).

In this specification, these values are expressed in terms of percentage. The refractive indexes in each equation may be arranged in any order. As a consequence, in this specification, the glass area where the average of relative refractive index differences with respect to the cladding region 12 is a negative value refers to a glass area having an average refractive index lower than that of the cladding region 12. Also, the average refractive index refers to the average of refractive indexes at their respective locations in a predetermined glass area when a cross section perpendicular to the advancing direction of signal light in the dispersion-shifted fiber 1 is observed.

The relationship between the amount of addition of germanium to a silica glass and its refractive index can be obtained from James W. Fleming, "Dispersion in $GeO_2$-$SiO_2$ glasses," (APPLIED OPTICS, Vol. 24, No. 24, Dec. 15, 1984, pp. 4486–4493); whereas the relationship between the amount of F added to a silica glass and its refractive index can be obtained from James W. Fleming et al., "Refractive index dispersion and related properties in fluorine doped silica," (APPLIED OPTICS, Vol. 23, No. 19, Oct. 1, 1983, pp. 3102–3104). The dispersion-shifted fiber 1 according to the present invention can be obtained by heating and drawing an optical fiber preform manufactured according to well-known OVD technique or MCVD technique or the like.

In particular, in the dispersion-shifted fiber 1 according to the present invention, the decrement $\Delta n_f$ in the average relative refractive index difference caused by the F doping in the inner core 10 and the increment $\Delta n_g$ in the average relative refractive index difference caused by the $GeO_2$ doping in the outer core 11 satisfy the following relationship:

$$0.05 \cdot \Delta n_g \leq \Delta n_f \leq 0.7 \cdot \Delta n_g.$$

Figure 2:
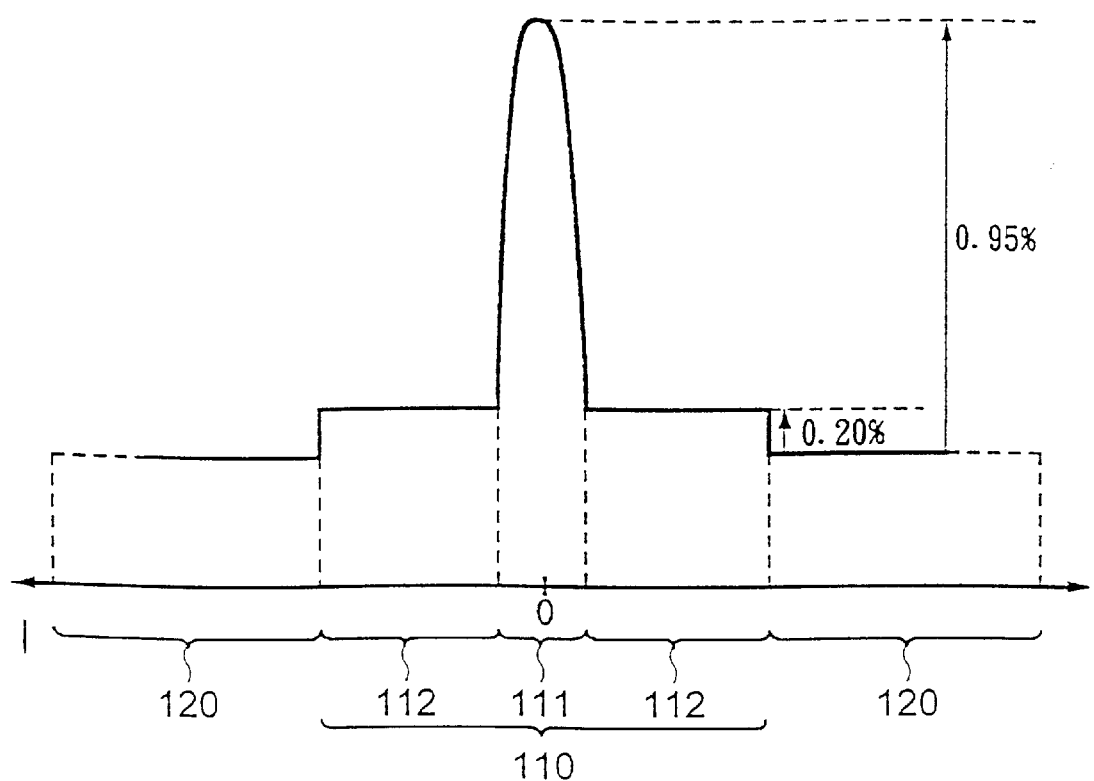
FIG. 2 is a view showing a refractive index profile of a conventional dispersion-shifted fiber employing a dual shape core structure.

It has been known that, in the case where viscosity mismatching between individual glass areas is large in a cross section of an optical fiber, the transmission loss caused by structural mismatching (structural mismatching loss) would increase (the Institute of Electronics, Information and Communication Engineers, Electronics Society Convention 1995, C-232). FIG. 2 is a view showing a refractive index profile of the conventional dispersion-shifted fiber employing a dual shape core structure shown in the publication mentioned above. In this refractive index profile, of an area 110 (corresponding to the individual locations along a diametrical direction of the whole core region), areas 111, 112, and 120 correspond to locations, along the diametrical direction, of the inner core, outer core, and cladding region.

Here, in order to suppress the structural mismatching loss to the extent similar to that in the dispersion-shifted fiber shown in FIG. 2, it is necessary for the viscosity mismatching (difference in viscosity at a drawing temperature) between the inner core 10 and outer core 11 to be consistent with that in the dispersion-shifted fiber of FIG. 2. In the dispersion-shifted fiber of FIG. 2, both inner and outer cores are doped with $GeO_2$, and the difference between the average relative refractive index difference of the average inner core and the average relative refractive index difference of the outer core is about 0.75%, which is equivalent to a viscosity ratio of about 4:1.

Figure 3:
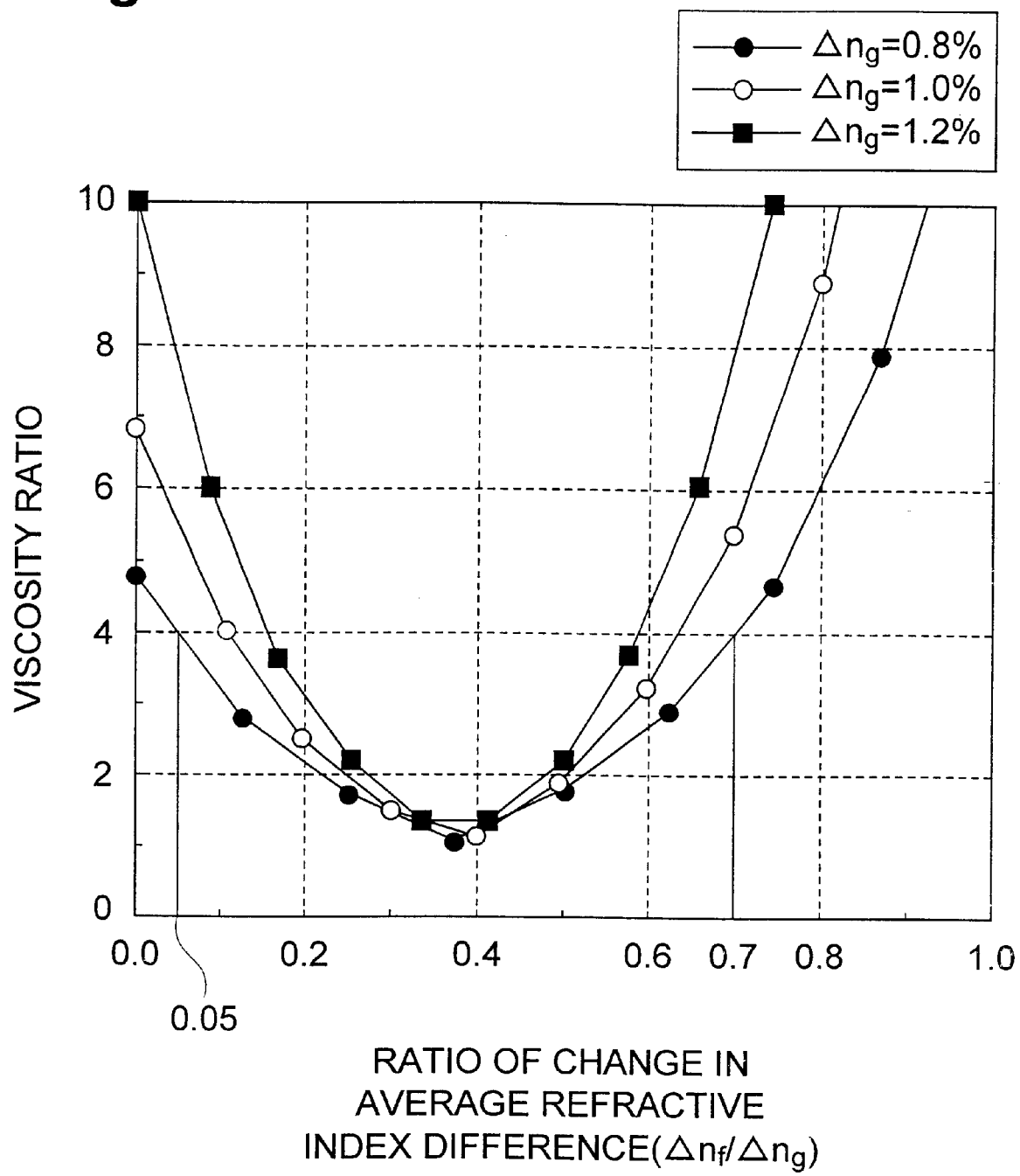
FIG. 3 is a graph showing a relationship between the ratio ($\Delta n_f / \Delta n_g$) of the change $\Delta n_f$ in average refractive index of the inner core caused by the F doping to the change $\Delta n_g$ in average refractive index of the outer core caused by the $GeO_2$ doping and the viscosity ratio at a drawing temperature.

On the other hand, as shown in FIG. 3, the viscosity ratio between an $SiO_2$ glass doped with $GeO_2$ and an $SiO_2$ glass doped with F at a predetermined drawing temperature (defined by the surface temperature of an optical fiber preform to be heated) varies as the respective doping amounts of F and $GeO_2$ change. This relationship is disclosed in P. K. Bachman, et al., "Stress in optical waveguides 2: Fibers,"(APPLIED OPTICS, Vol. 26, No. 7, Apr. 1, 1987).

Namely, FIG. 3 shows, when the viscosity ratio between the inner core 10 and the outer core 11 is calculated according to the above-mentioned relationship in the dispersion-shifted fiber 1, how the viscosity ratio changes according to the ratio ($\Delta n_f/\Delta n_g$) between decrement $\Delta n_f$ in the average relative refractive index difference caused by the F doping in the inner core 10 and the increment $\Delta n_g$ in the average relative refractive index difference caused by the $GeO_2$ doping in the outer core 11. The decrement $\Delta n_f$ and increment $\Delta n_g$ are each represented by an average relative refractive index difference with respect to the cladding 12 (wherein the changes $\Delta n_f$ and $\Delta n_g$ are both scalar quantities). Also, FIG. 3 shows a typical value of the dispersion-shifted fiber 1, using the increment $\Delta n_g$ caused by the $GeO_2$ doping into the outer core 11 as a parameter ($\Delta n_g$=0.8%, 1.0%, and 1.2%).

As can be seen from FIG. 3, when $\Delta n_f/\Delta n_g$ is within the range of 0.05 to 0.70, the viscosity ratio between the inner core 10 and the outer core 11 becomes 4 or less, thereby the structural mismatching loss can be suppressed to the extent similar to that of the dispersion-shifted fiber of FIG. 2 or less.

In the dispersion-shifted fiber according to the present invention, it is more preferred that the average refractive index of the inner core 10 be smaller than the refractive index of the cladding region 12. It is due to the fact that, when the relative refractive index difference $\Delta n_1$ with respect to the cladding region 12 is set to a negative value, a desired fiber characteristic can be realized without extremely increasing the average relative refractive index difference $\Delta n_2$ ($>\Delta n_1$) of the outer core 11 with respect to the cladding region 12. In other words, while attaining a desired fiber characteristic, the amount of $GeO_2$ added to the outer core 11 can be reduced, thus making it possible to effectively reduce nonlinear optical effects from occurring.

Embodiment 1

The dispersion-shifted fiber according to Embodiment 1 of the present invention will now be explained with reference to FIGS. 4A, 4B, and 6.

Figure 4A:
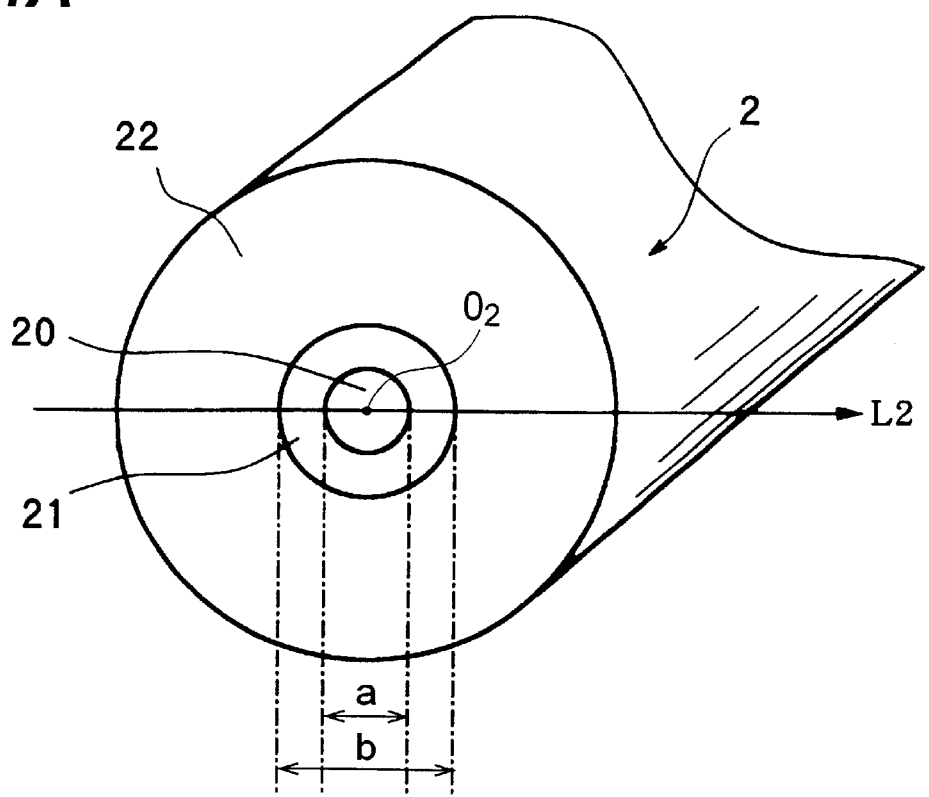
Figure 4B:
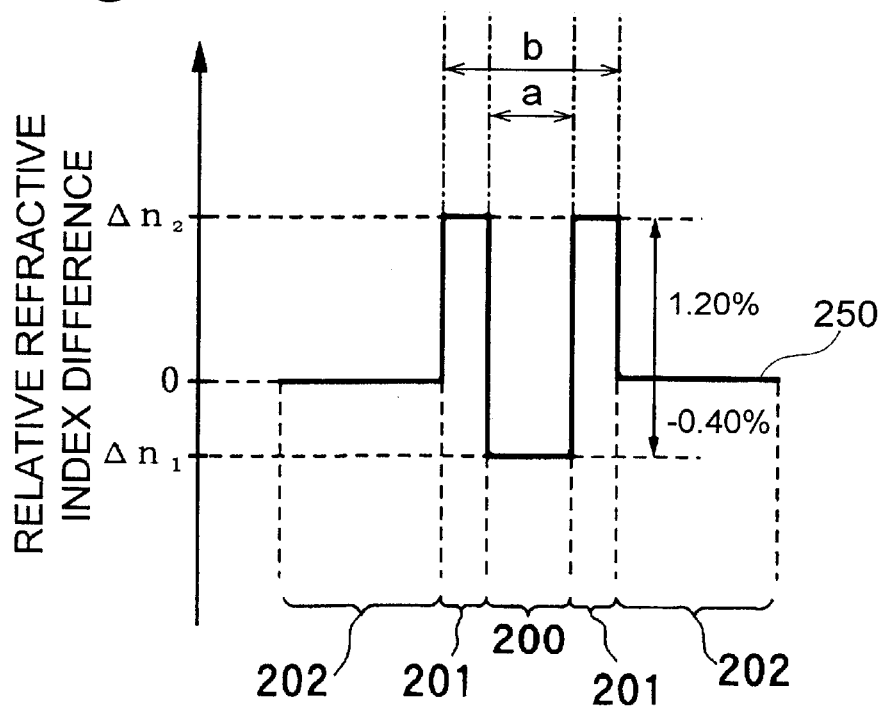
FIG. 4B is a view showing a refractive index profile of the dispersion-shifted fiber shown in FIG. 4A.

The cross-sectional structure of the dispersion shifted fiber 2 according to Embodiment 1 shown in FIG. 4A is basically the same as that of the dispersion-shifted fiber 1 shown in FIG. 1A; and comprises an inner core 20 (corresponding to the inner core 10) having an outer diameter a, an outer core 21 (corresponding to the outer core 11) having an outer diameter b, and a cladding region 22 (corresponding to the cladding region 12). The refractive index profile 250 of FIG. 4B, as in the case of FIG. 1B, indicates the refractive index of each location on the line L2 intersecting with a center $O_2$ in a cross section (plane orthogonal to the advancing direction of the propagating light) of the dispersion-shifted fiber 2 in conformity to FIG. 4A. In the refractive index profile 250, areas 200, 201, and 202 correspond to locations, on the line L2, of the inner core 20, outer core 21, and cladding region 22, respectively.

In Embodiment 1, the outer diameter b of the outer core 21 is 7.5 $\mu$m, and the outer diameter ratio Ra (=a/b) between the inner core 20 and the outer core 21 is 0.65. The inner core 20 is doped with F, whereas the outer core 21 is doped with $GeO_2$1 thereby the average relative refractive index difference $\Delta n_1$ of the inner core 20 and the average relative refractive index difference $\Delta n_2$ of the outer core 21, which are given by the above-mentioned defining equations, are set to −0.40% and +1.20%, respectively.

The table of FIG. 6 (Embodiment 1) shows fiber characteristics of thus designed dispersion-shifted fiber 2 with respect to signal light at a wavelength of 1550 nm. The inventors have confirmed that the transmission loss of thus obtained dispersion-shifted fiber 2 with respect to signal light at a wave length of 1550 nm is small, i.e., 0.22 dB/km. Also, in the illustrated embodiment, the dispersion-shifted fiber 2 has a zero-dispersion wave length of 1580 nm, a dispersion slope of 0.088 ps/nm²/km, and an effective area of 86 $\mu m^2$, thereby realizing fiber characteristics suitable for WDM transmission.

The table of FIG. 6 also lists nonlinear refractive index N2. It is due to the fact that, as the advent of optical amplifiers has enabled techniques for wavelength-division multiplexing long-haul optical transmission, the distortion in signal light pulses caused by nonlinear optical effects such as four-wave mixing has become a critical factor restricting the transmission distance and transmission bit rate, which factor is not negligible in the making of the dispersion-shifted fiber according to the present invention.

The nonlinear optical effects causing the distortion in signal light pulses have been known to increase in proportion to the optical power density (density of signal light intensity at a predetermined location in an SM optical fiber) and the nonlinear refractive index of the optical fiber, which is an optical transmission medium. Consequently, in an optical transmission system employing an optical amplifier, the distortion in signal light pulses caused by nonlinear optical effects which have not been problematic in the conventional optical transmission system employing no optical amplifier is not negligible anymore as the signal light intensity increases.

Here, the refractive index N of a medium under strong light varies depending on light intensity as mentioned above. Consequently, the lowest-order effect with respect to the refractive index N is represented by:

$$N = N0 + N2 \cdot P$$

wherein

N0 is the refractive index with respect to linear polarization;

N2 is the nonlinear refractive index with respect to the third-order nonlinear polarization;

P is the optical power; and $A_{eff}$ is the effective area.

Namely, under strong light, the refractive index N of the medium is given by the sum of the normal value N0 and the increment proportional to the square of the photoelectric field amplitude of light E. In particular, the constant of proportionality N2 (unit: $m^2/W$) in the second term is known as nonlinear refractive index. Since the distortion in signal light pulses is mainly influenced by, of the nonlinear refractive index, the second-order nonlinear refractive index, the nonlinear refractive index in this specification mainly refers to the second-order nonlinear refractive index.

Embodiment 2

The dispersion-shifted fiber according to Embodiment 2 of the present invention will now be explained with reference to FIGS. 5A, 5B, and 6.

Figure 5A:
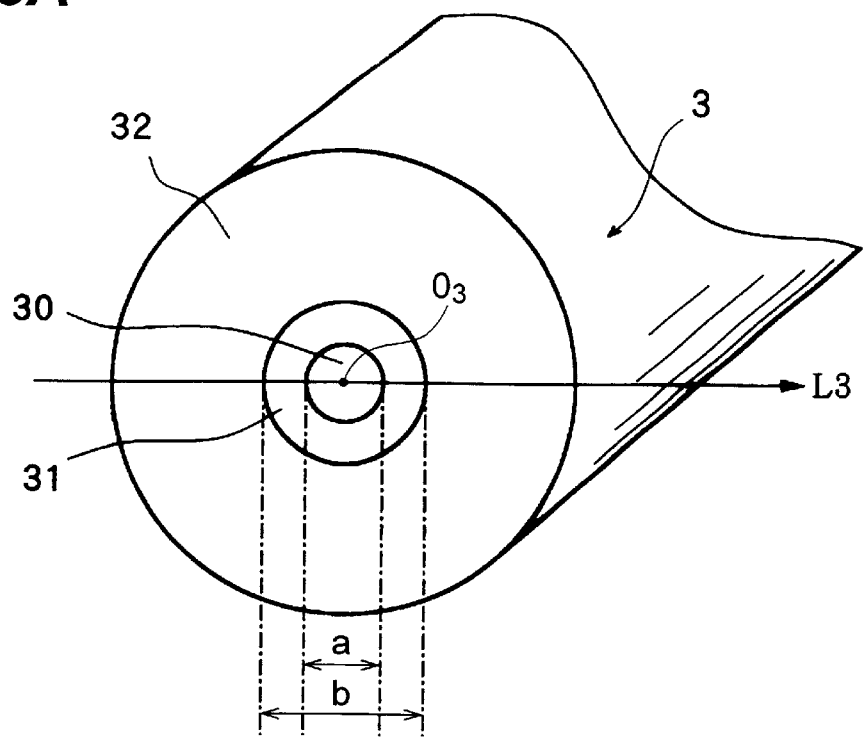
Figure 5B:
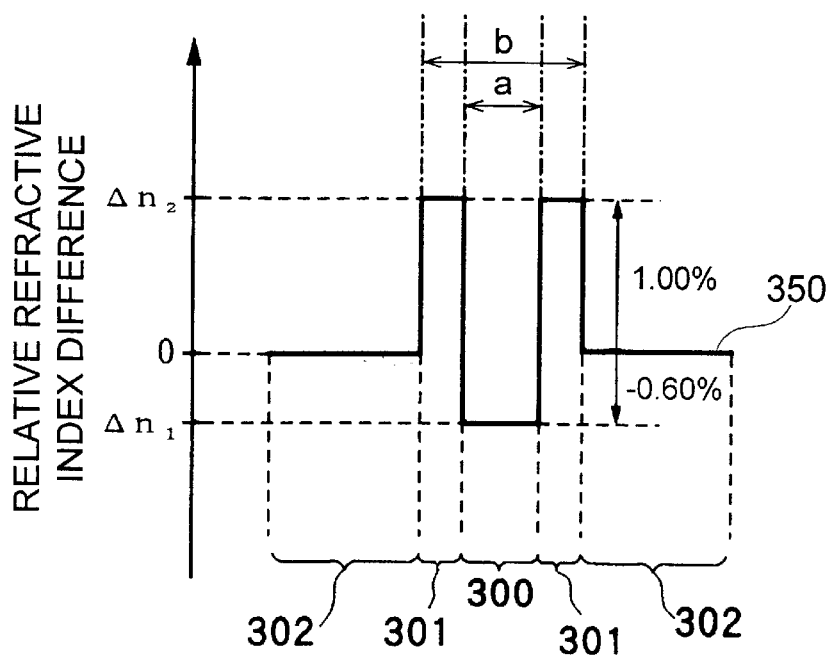
FIG. 5B is a view showing a refractive index profile of the dispersion-shifted fiber shown in FIG. 5A.

The cross-sectional structure of the dispersion-shifted fiber 3 according to Embodiment 2 shown in FIG. 5A is basically the same as that of the dispersion-shifted fiber 1 shown in FIG. 1A; and comprises an inner core 30 (corresponding to the inner core 10) having an outer diameter a, an outer core 31 (corresponding to the outer core 11) having an outer diameter b, and a cladding region 32 (corresponding to the cladding region 12). The refractive index profile 350 of FIG. 5B, as in the case of FIG. 1B, indicates the refractive index of each location on the line L3 intersecting with a center $O_3$ in a cross section (plane orthogonal to the advancing direction of the propagating light) of the dispersion-shifted fiber 3 in conformity to FIG. 5A. In the refractive index profile 350, areas 300, 301, and 302 correspond to locations, on the line L3, of the inner core 30, outer core 31, and cladding region 32, respectively.

In Embodiment 2, the outer diameter b of the outer core 21 is 7.1 $\mu$m, and the outer diameter ratio Ra (=a/b) between the inner core 30 and the outer core 31 is 0.60. The inner core 30 is doped with F, whereas the outer core 31 is doped with $GeO_2$, thereby the average relative refractive index difference $\Delta n_1$ of the inner core 30 and the average relative refractive index difference $\Delta n_2$ of the outer core 31, which are given by the above-mentioned defining equations, are set to −0.60% and +1.00%, respectively.

Thus, in the dispersion-shifted fiber 3 according to Embodiment 2, the amount of F added to the inner core 30 is made greater than that in Embodiment 1 (thus changing the average relative refractive index difference $\Delta n_1$ from −0.40% to −0.60%), thereby reducing the amount of $GeO_2$ added to the outer core 31, without changing the difference between the average relative refractive index difference of the inner core 30 and the average relative refractive index difference of the outer core 31.

The table of FIG. 6 (Embodiment 2) shows fiber characteristics of thus designed dispersion-shifted fiber 3 with respect to signal light at a wavelength of 1550 nm. As can be seen from this table, the dispersion-shifted fiber 3 according to Embodiment 2 can lower the average relative refractive index difference $\Delta n_2$ of the outer core 31 to 1.00%, while maintaining, substantially as with Embodiment 1 mentioned above, a zero-dispersion wavelength of 1580 nm, a dispersion slope of 0.086 $ps/nm^2/km$, and an effective cross-sectional area of 83 $\mu m^2$. The transmission loss of the dispersion-shifted fiber 3 according to Embodiment 2 with respect to signal light at a wavelength of 1550 nm is 0.21 dB/km, which is smaller than that in Embodiment 1 mentioned above.

Embodiment 3

The dispersion-shifted fiber according to Embodiment 3 of the present invention will now be explained with reference to FIGS. 7A and 7B.

Figure 7A:
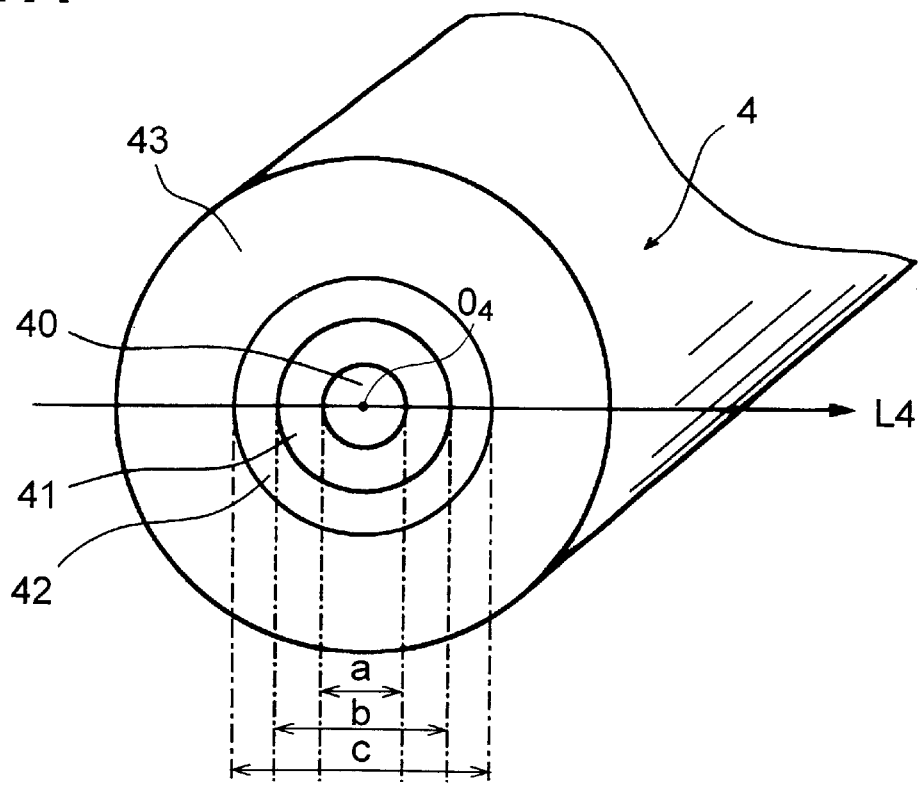
Figure 7B:
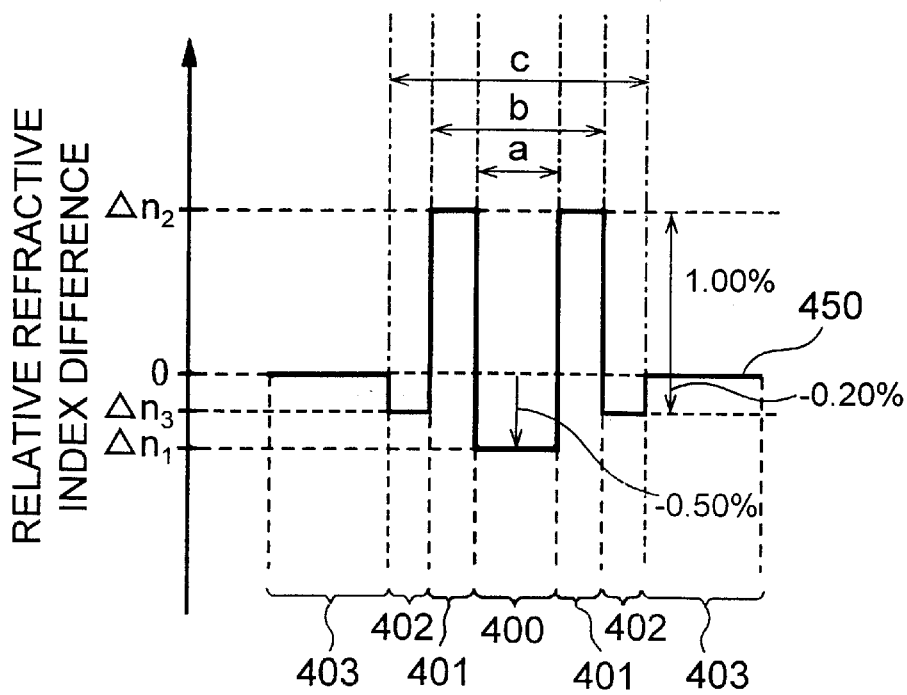
FIG. 7B is a view showing a refractive index profile of the dispersion-shifted fiber shown in FIG. 7A.

The cross-sectional structure of the dispersion-shifted fiber 4 according to Embodiment 3 shown in FIG. 7A comprises an inner core 40 having an outer diameter a, an outer core 41 having an outer diameter b, an inner cladding 42 having an outerside diameter c, and an outer cladding 43. The refractive index profile 450 of FIG. 7B, as in the case of FIG. 1B, indicates the refractive index of each location on the line L4 intersecting with a center $O_O$ in a cross section (plane orthogonal to the advancing direction of the propagating light) of the dispersion-shifted fiber 4 in conformity to FIG. 7A. In the refractive index profile 450, areas 400, 401, 403 and 404 correspond to locations, on the line L4, of the inner core 40, outer core 41, inner cladding 42, and outer cladding 43, respectively.

In Embodiment 3, the outer diameter a of the inner core 40 is 4.4 $\mu$m, the outer diameter b of the outer core 41 is 7.9 $\mu$m, the outer diameter c of the inner cladding 42 is 13.9 $\mu$m. The inner core 4 and the inner cladding 42 are doped with F, whereas the outer core 41 is doped with $GeO_2$, thereby the average relative refractive index difference $\Delta n_1$ of the inner core 40, the average relative refractive index difference $\Delta n_2$ of the outer core 41, and the average relative refractive index difference $\Delta n_3$ of the inner cladding 42, which are given by the above-mentioned defining equations, are set to −0.50%, +1.00%, and −0.20%, respectively.

The above-mentioned average relative refractive index difference values $\Delta n_1$, $\Delta n_2$, and $\Delta n_3$ are given by:

$$\Delta n_1 = (n_1 - n_{cd})/n_{cd}$$

$$\Delta n_2 = (n_2 - n_{cd})/n_{cd}$$

$$\Delta n_3 = (n_3 - n_{cd})/n_{cd}$$

wherein
 $n_1$ is the average refractive index of the inner core 40;
 $n_2$ is the average refractive index of the outer core 41;
 $n_3$ is the average refractive index of the inner core 42; and
 $n_{cd}$ is the average refractive index of the outer cladding 43.

Thus designed dispersion-shifted fiber of Embodiment 3 has a zero-dispersion wavelength of 1590 nm, and has, as characteristics with respect to light of 1550 nm, a dispersion slope of 0.070 $ps/nm_2/km$, an effective core sectional area of 83 $\mu m^2$, a transmission loss of 0.21 dB/km, a cutoff wavelength of 1.4 $\mu$m at 2 m length, a mode field diameter (MFD) of 7.4 $\mu$m, a nonlinear refractive index(N2) of $3.7 \times 10^{-20}$ $m^2/W$, and a bending loss of 5.7 dB/m at a bending diameter of 20 mm.

Further, in Embodiment 3 having a depressed cladding structure as described above, a decrement $\Delta n_{f1}$ in the first average relative refractive index difference caused by the F doping in the inner core, a decrement $\Delta n_{f2}$ in the third average relative refractive index difference caused by the F doping in the inner cladding and an increment $\Delta n_g$ in the second average relative refractive index difference caused by the $GeO_2$ doping in the outer core satisfy the following relationships:

$$0.05 \cdot \Delta n_g \leq \Delta n_{f1} \leq 0.7 \cdot \Delta n_g$$

$$0.05 \cdot \Delta n_g \leq \Delta n_{f2} \leq 0.7 \cdot \Delta n_g.$$

INDUSTRIAL APPLICABILITY

As explained in detail in the foregoing, since the inner core is doped with a predetermined amount of F, and the outer core is doped with a predetermined amount of $GeO_2$, such that the viscosity ratio between the individual glass regions at a drawing temperature is set within a predetermined range, the present invention can securely reduce the structural mismatching, glass defect, and the like at the boundary between the inner core and the outer core, thereby effectively restraining transmission loss from increasing due to such a problem.

Also, since the average refractive index of the inner core is set lower than the refractive index of the cladding region, the amount of $GeO_2$ added to the outer core can be lowered, thereby the transmission loss increasing depending on the amount of $GeO_2$ can be further reduced.

What is claimed is:

1. A dispersion-shifted fiber for propagating signal light in a 1.55-$\mu$m wavelength band, said dispersion-shifted fiber comprising:
   a core region extending along a predetermined reference axis; and
   a cladding region disposed on the outer periphery of said core region,
   said core region comprising:
      an inner core doped with a predetermined amount of fluorine and having a first average relative refractive index difference $\Delta n_1$ with respect to a predetermined region of said cladding region; and
      an outer core provided between said inner core and said cladding region, said outer core doped with a predetermined amount of germanium dioxide and having a second average relative refractive index difference $\Delta n_2$ greater than said first average relative refractive index difference with respect to said predetermined region of said cladding region,
   wherein a decrement $\Delta n_f$ in said first average relative refractive index difference caused by the fluorine doping in said inner core and an increment $\Delta n_g$ in said second average relative refractive index difference caused by the germanium dioxide doping in said outer core have the following relationship:

$$0.05 \cdot \Delta n_g \leq n_f \leq 0.7 \cdot \Delta n_g.$$

2. A dispersion-shifted fiber according to claim 1, wherein said inner core has an average refractive index smaller than the refractive index of said cladding region.

3. A dispersion-shifted fiber according to claim 1, wherein said cladding region comprises an inner cladding provided around the periphery of said outer core, said inner cladding doped with a predetermined amount of fluorine and having a third average relative refractive index difference $\Delta n_3$ with respect to said predetermined region of said cladding region; and an outer cladding as said predetermined region of said cladding region, provided around the outer periphery of said inner cladding.

4. A dispersion-shifted fiber according to claim 3, wherein a decrement $\Delta n_{f1}$, in said first average relative refractive index difference caused by the fluorine doping in said inner core, a decrement $\Delta n_{f2}$ in said third average relative refractive index difference caused by the fluorine doping in said inner cladding, and an increment $\Delta n_g$ in said second average relative refractive index difference caused by the germanium dioxide doping in said outer core have the following relationships:

$$0.05 \cdot \Delta n_g \leq \Delta n_{f1} \leq 0.7 \cdot \Delta n_g$$

$$0.05 \cdot \Delta n_g \leq \Delta n_{f2} \leq 0.7 \cdot \Delta n_g.$$

\* \* \* \* \*